US005664370A

United States Patent [19]
Boudreau et al.

[11] Patent Number: 5,664,370
[45] Date of Patent: Sep. 9, 1997

[54] PLANT GROWING TRAY

[75] Inventors: Jean-Marie Boudreau, Shippagan, Canada; Cor Baars, Batavia, Ill.

[73] Assignee: Jiffy Products of America, Inc., Batavia, Ill.

[21] Appl. No.: 611,614

[22] Filed: Mar. 8, 1996

[51] Int. Cl.⁶ .................................................. A01G 9/02
[52] U.S. Cl. ........................... 47/87; 47/86; 47/66.5
[58] Field of Search .......................... 47/86, 66 I, 87, 47/56, 66 N, 65 D

[56] References Cited

U.S. PATENT DOCUMENTS

| 3,513,594 | 5/1970 | Hasselbach | 47/66 I |
| 3,543,438 | 12/1970 | Edwards | 47/87 |
| 4,611,428 | 9/1986 | Häskle | 47/86 |
| 4,620,390 | 11/1986 | Mekler | 47/56 |

FOREIGN PATENT DOCUMENTS

| 1665954 | 7/1991 | U.S.S.R. | 47/86 |
| 1160390 | 8/1969 | United Kingdom | 47/65 D |

*Primary Examiner*—Terry Lee Melius
*Assistant Examiner*—Joanne C. Downs
*Attorney, Agent, or Firm*—Ladas & Parry

[57] ABSTRACT

A plant growing tray comprises a plurality of strips of tray compartments and a foldable portion or pleat connecting two adjacent strips of the tray compartments. The foldable connecting portion is generally a V-groove having a folding line along the bottom of the groove. Two end members are provided optionally at both ends of the foldable V-groove portion. Each tray compartment has an opening on its bottom.

4 Claims, 3 Drawing Sheets

FIG. IA
PRIOR ART
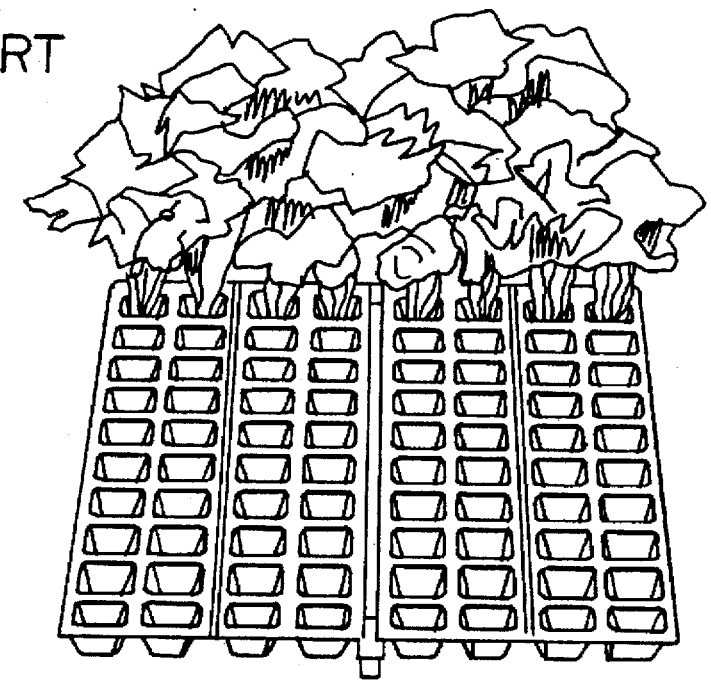
FIG. IB
PRIOR ART
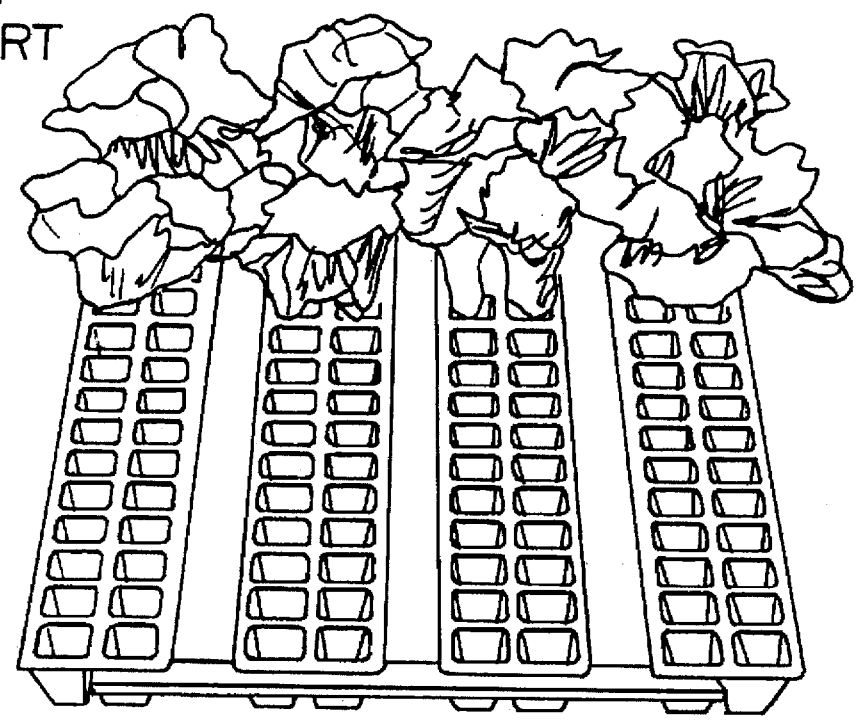

PLANT GROWING TRAY

This invention relates to a growing tray for use in the greenhouse industry. In particular, this invention relates to a growing tray for the initial growing of roots and starter plants.

BACKGROUND OF THE INVENTION

In the greenhouse industry, certain kinds of containers are required to hold soil and waters for growing plants. During the period of rooting, cuttings or starting seeds, there is not much space required for arranging a plurality of such containers. In fact, these containers can be placed very closely with each other. When the plants grow bigger, a prescribed spacing among adjacent plants is required to provide optimum air and light so as to assure better growing of the starter plants before the starter plants are sold to the customers, and are finally separated.

To maximize the effective use of the greenhouse space and provide optimum spacing, the growing trays with adjustable spacing are in demand. For example, a product known as ECO TRAY® has been manufactured and sold in the market by Knipping BV, a Dutch company. The ECO TRAY® is a molded plastic tray that has two rows of tray compartments in each piece. The trays are arranged one piece adjacent to another and kept with the prescribed spacing between the adjacent pieces by a bar called ECO-plug®. When the plants are growing up, the trays are rearranged to adjust the spacing between them and held by a different spacing bar, i.e. ECO-plug®, to maintain the adjusted spacing. The rearrangement of the trays and replacement of the spacing bars still require a lot of labor work and costs.

SUMMARY OF THE INVENTION

It is therefore the primary objective of this invention to provide a space saving greenhouse growing tray.

It is another objective of this invention to provide a growing tray with easily adjustable spacing.

It is a further objective of this invention to provide a growing tray that has lower manufacturing cost and is capable of saving labor costs for the greenhouse industry.

Accordingly to the present invention, a plant growing tray comprises a plurality of strips of tray compartments, and a foldable portion formed between two adjacent strips thereby connecting the plurality of strips to form a single piece of tray.

Each of the foldable portions has a V-shaped cross section and thus appears to be a V-groove. A folding line is formed along the bottom of the V-groove. There may be provided two foldable end members that are respectively formed at both ends of each V-groove. The end members will be aligned with the ends of the strips of tray compartments.

Soil or compressed peat pellets can be accommodated in each compartment for rooting, cuttings or starting seeds. Each V-groove initially remains folded. When the plants have started growing, the V-groove foldable portion may be unfolded to adjust the spacing between the strips so as to provide optimum spacing for growing the starter plants.

Use, in the tray compartments are filled with soil or compressed soil pellets, such as Jiffy-7® of Jiffy Products of America, Inc. The growing tray of this invention appears to have accordion pleats between the strips of the tray compartments, or the pellet strips. The accordion pleats allow the strips to be compressed for a tight shipping unit.

Normally, the customer who receives rooted cuttings has to unload the boxes and spread the cuttings out so that the rooted cuttings will not deteriorate before potting up. The accordion pleats of this invention may spring back to the correct spacing without any effort of spacing the cuttings individually. Thus, this invention enables the significant saving of the time, which will otherwise be required.

BRIEF DESCRIPTION OF THE DRAWINGS

The detailed features of the present invention can be better understood in connection with the description of the preferred embodiment as shown in the accompanying drawings.

FIGS. 1A and 1B are the perspective view of prior art growing tray.

DETAILED DESCRIPTION OF THE INVENTION

As shown in FIGS. 1A and 1B, the prior art growing tray includes two rows or strips of tray compartments or tray cells in each piece. The arranged trays are spaced from one another by one or more separate piece of spacing bars. When the spacing of the trays is adjusted, the spacing bars have to be replaced with a new one of different spacing scales. A lot of work for adjusting the spacing between the trays is still required.

Figure 2:
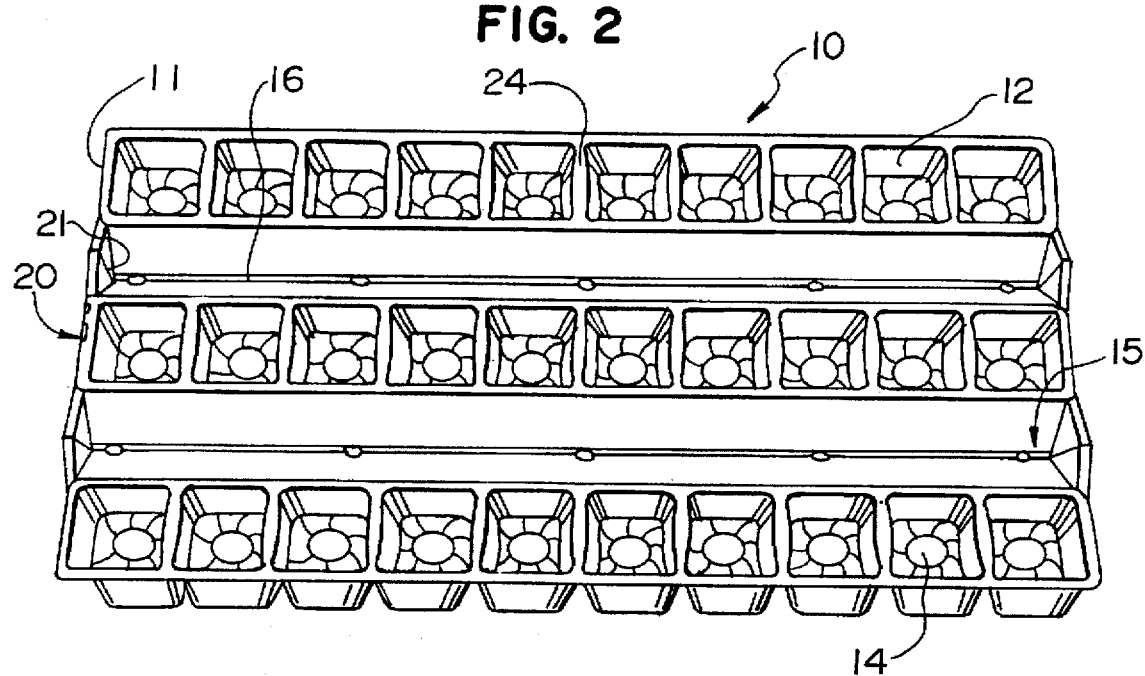
FIG. 2 is a perspective view of the preferred embodiment of the present invention.

The growing tray 10 of the present invention is shown in FIG. 2. It comprises a plurality of strips 11 of tray compartments 12. Each strip 11 has a plurality of tray compartments 12 for holding soil or compressed peat pellets 17 (shown in FIG. 4A) for planting starting seeds and rooting. Each compartment 12 has an opening 14 on the bottom for the purpose of drainage and air for the plant roots.

Every two adjacent strips 11 of the tray compartments 12 are connected by a V-groove foldable portion or pleat 15, which has a folding line 16 on its bottom.

Figure 3A:
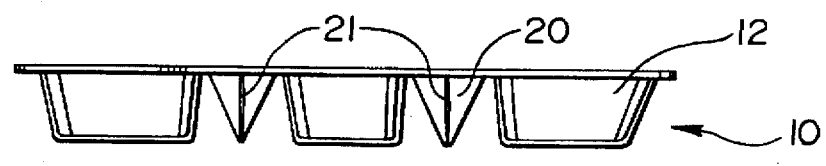
FIGS. 3A and 3B show respectively the end and side views of the present invention.
Figure 3B:
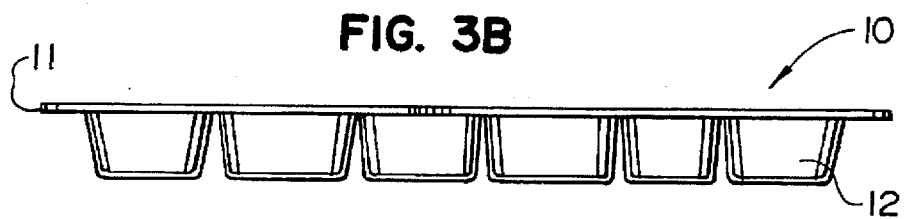

FIGS. 3A and 3B show respectively end and side of the growing tray of this invention. Both ends 18 of the V-groove foldable portion or pleat 15 have respectively a V-shaped end member 20. Each of the end members 20 is foldable and has a folding line 21 in alignment with the folding line 16 of the V-groove foldable portion or pleat 15 (as seen in FIG. 2).

The folding line 21 of the end member 20 can be simply a vertical cutting line that may permit drainage of water in the V-groove foldable portion or pleat 15. On the other hand, a plurality of openings or apertures can be formed at the bottom of the V-groove portion or pleat 15 along the folding line 16 of the V-groove portion or pleat 15 for the purpose of water drainage.

As noted in FIG. 2, each compartment wall 24 between the tray compartment 12 appears to be an elongated part, in a top view, having opposite convex side surfaces. In molding the growing tray 10 from a single piece of plastic foil, such convex side surfaces may acquire strength for maintaining the tray compartments 12.

Figure 4A:
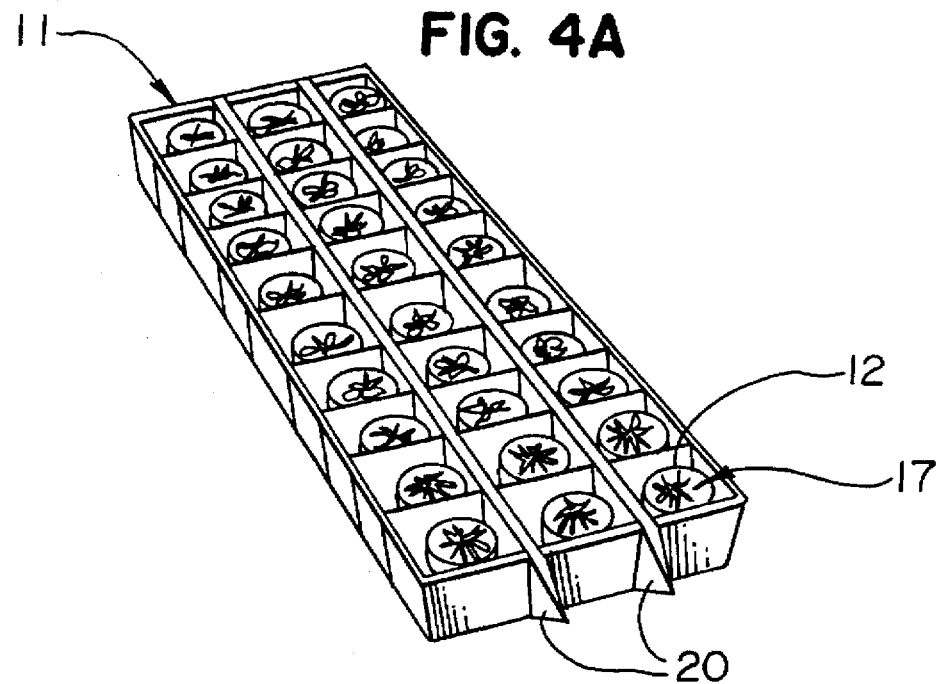
FIGS. 4A and 4B show respectively the present invention in folded condition.
Figure 4B:
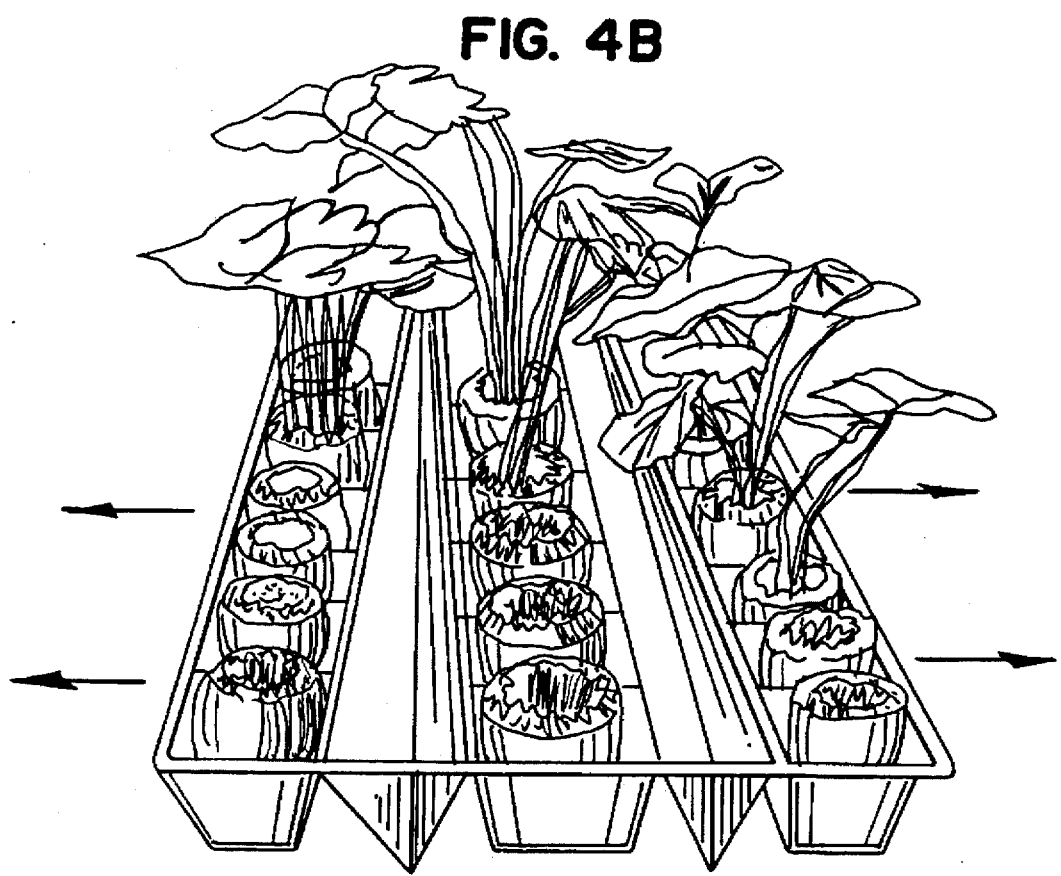

FIGS. 4A and 4B show respectively the growing tray of this invention being folded for a tight shipping units. The tray contains the compressed peat pellets in each tray compartment. FIG. 4B illustrates that the strips of the tray compartments are springing back to unfolded condition. It also shows that the starter plants are growing up such that more spacing between the strips is required.

To manufacture the growing tray of this invention, the sheet material used can be relatively thin. The process for manufacturing the tray is also simple because the tray can be compressed from a thin foil to form the single piece of growing tray. The prior art ECO TRAY® requires additional spacing bars. Thus, the manufacturing cost of this invention is reduced.

The further advantage of this invention is labor saving for adjusting the spacing between the strips of tray compartments. This can be done by simply letting the pleats go unfolded or slightly stretching the V-groove foldable portions or pleats 15. For instance, the growing tray of three rows of 30 tray compartments as shown in FIG. 2 may have a size of 20"×10" with the V-grooves unfolded. It can be squeezed or folded to be shipped in 20"×6" containers. The thin plastic tray can be easily compressed and disposed by the receiving customer for recycling. The used and compressed tray occupies a very little space.

Furthermore, the end members of the V-groove foldable portions or pleats can be eliminated for further saving the amount of material used although the end members are preferred for the purpose of integral connection of the strips of tray compartments. Thus, it should be pointed out that any obvious variation is within the scope of the present invention.

What is claimed is:

1. A plant growing tray comprising: a plurality of strips of tray compartments, integral means for connecting two adjacent strips of tray compartments, said connecting means being foldable and having a V-shaped groove portion with a folding line along its bottom, and an integral end member provided respectively at each end of said foldable V-shaped groove portion, each end member also having a folding line in alignment with the folding line of the V-shaped groove portion, whereby in use said connecting means maintains said strips of tray compartments separated from one another.

2. The growing tray of claim 1, wherein said folding line of each of said end members is a vertical cutting line.

3. The growing tray of claim 1, wherein each of said tray compartments has at least one opening on its bottom.

4. The growing tray of claim 1, wherein each compartment wall between two adjacent tray compartments has two opposite convex side surfaces.

* * * * *